(12) United States Patent
Goodson

(10) Patent No.: US 8,437,355 B1
(45) Date of Patent: May 7, 2013

(54) SYSTEMS AND METHODS FOR SCHEDULING BUSINESS AND RESIDENTIAL SERVICES IN OPTICAL NETWORKS

(75) Inventor: Richard Goodson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 373 days.

(21) Appl. No.: 12/939,236

(22) Filed: Nov. 4, 2010

(51) Int. Cl.
*H04L 12/28* (2006.01)
(52) U.S. Cl.
USPC .................................. 370/395.4; 370/395.42
(58) Field of Classification Search .................. None
See application file for complete search history.

(56) References Cited

U.S. PATENT DOCUMENTS

| | | | |
|---|---|---|---|
| 7,660,251 B2 | 2/2010 | Grosbach et al. | |
| 2005/0071504 A1 | 3/2005 | Handlogten et al. | |
| 2007/0133989 A1* | 6/2007 | Kim et al. | 398/69 |
| 2007/0248109 A1* | 10/2007 | DeCarolis et al. | 370/412 |
| 2009/0103545 A1* | 4/2009 | Anschutz et al. | 370/395.4 |
| 2009/0109846 A1 | 4/2009 | Sinha | |
| 2010/0008379 A1* | 1/2010 | Yoo et al. | 370/468 |

OTHER PUBLICATIONS

"Technical Report DSL Forum TR-059, DSL Evolution—Architecture Requirements for the Support of QoS—Enabled IP Services," Digital Subscriber Line Forum, Sep. 2003.

* cited by examiner

*Primary Examiner* — Phirin Sam
(74) *Attorney, Agent, or Firm* — Maynard Cooper & Gale, P.C.; Jon E. Holland

(57) ABSTRACT

A passive optical network (PON) has an optical line termination (OLT) that terminates an optical fiber servicing a plurality of optical network units (ONUs). Each ONU has one or more traffic containers (TCONTs) addressable by the OLT. The PON dynamic bandwidth allocation (DBA) implements a scheduling hierarchy, including several scheduling layers, such that disjoint sets of TCONTs can be grouped together, then disjoint sets of groups can be grouped, and so on. In such hierarchy, the residential traffic can be grouped separately from the business traffic. Further, within either the residential or business group, traffic may be grouped to define scheduling layers ("sub-groups") within the residential or business group. Scheduling in one group or sub-group is performed independently of the scheduling in other groups or subgroups, subject to the available bandwidth for each group. The scheduling may be controlled to allow the residential services to be oversubscribed while still ensuring compliance of service level performance metrics for the business services.

8 Claims, 5 Drawing Sheets

SYSTEMS AND METHODS FOR SCHEDULING BUSINESS AND RESIDENTIAL SERVICES IN OPTICAL NETWORKS

RELATED ART

Dynamic bandwidth allocation (DBA) is a technique defined in various optical systems, such as a gigabit passive optical network (GPON) or broadband passive optical network (BPON), for transferring traffic from multiple optical network units (ONUs) to an optical line termination (OLT) across a shared fiber medium, referred to as a passive optical network (PON). Each ONU has a set of traffic containers (TCONTs), which are OLT-addressable data units that contain the traffic to be sent to the OLT. The OLT will allocate or grant bandwidth to a given TCONT, indicating the exact time and amount of data that the ONU can transmit data on the PON from the given TCONT. In general, different TCONTs on a given ONU represent different traffic classes or forwarding behaviors. Through DBA, available bandwidth on the PON is divided among the different TCONTs while enforcing the desired forwarding behavior.

In GPON, there are generally two types of DBA: status reporting (SR) and non-status reporting (NSR). In SR DBA, the OLT learns the current backlog status by requesting a status report for each TCONT. Each ONU reports the backlog status of each TCONT in the ONU, and the OLT dynamically updates the bandwidth allocation for all TCONTs based on the reported backlog status. Typically, the status report is "piggy-backed" at the end of a bandwidth grant for a given TCONT.

In NSR DBA, the OLT infers the current backlog status by observing the frames present in the bandwidth grant for a given TCONT. If an ONU has no data to send during the bandwidth grant for a given TCONT, it transmits idle frames, indicating no backlog. The OLT observes which of the TCONTs transmit idle frames and dynamically updates the bandwidth allocation based on the inferred backlogged status.

In a converged network, both residential and business traffic share the same communication medium and network elements. Thus, in the access portion of a converged network, both business and residential traffic are carried by the same subscriber line (e.g., a twisted-wire pair), PON, etc., and are aggregated in the same digital subscriber line access multiplexer (DSLAM) or edge router. During periods of congestion, backlogs can become significant affecting whether specified performance parameters, such as those specified by service level agreements (SLAs), are violated for the residential and business services sharing the communication medium and network elements.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for scheduling business and residential services in optical networks. In one exemplary embodiment, a passive optical network (PON) has an optical line termination (OLT) that terminates an optical fiber servicing a plurality of optical network units (ONUs). Each ONU has one or more traffic containers (TCONTs) addressable by the OLT. The PON dynamic bandwidth allocation (DBA) implements a scheduling hierarchy, including several scheduling layers, such that disjoint sets of TCONTs can be grouped together, then disjoint sets of groups can be grouped, and so on. In such hierarchy, the residential traffic can be grouped separately from the business traffic. Further, within either the residential or business group, traffic may be grouped to define scheduling layers ("sub-groups") within the residential or business group. Scheduling in one group or sub-group is performed independently of the scheduling in other groups or sub-groups, subject to the available bandwidth for each group.

In one exemplary embodiment, the scheduling is controlled to allow the residential services to be oversubscribed while still ensuring compliance of service level agreements for the business services. In this regard, during periods of congestion resulting from oversubscription of residential services, the scheduling is controlled such that sufficient bandwidth is preserved for the business services to meet their specified SLAs at the expense of the residential services.

Figure 1:
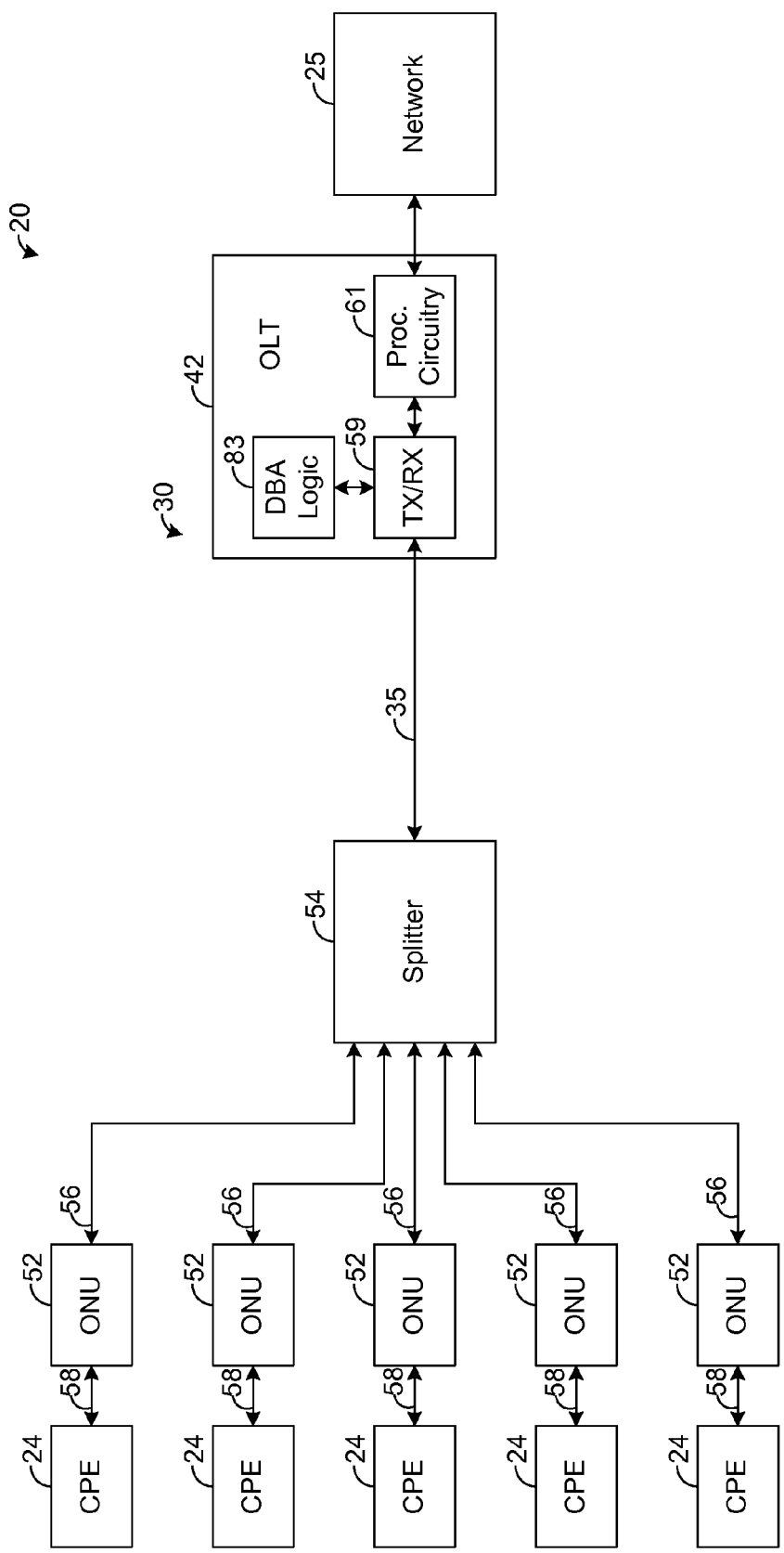
FIG. 1 is a block diagram illustrating an exemplary embodiment of a communication system in accordance with the present disclosure.

FIG. 1 depicts an exemplary embodiment of a communication system 20 having a plurality of optical network units (ONUs) 52 communicating with a communication network 25, such as the Publicly Switched Telephone Network (PSTN) or other known telephony network. A passive optical network (PON) 30 comprises ONUs 52, optical fibers 35 and 56, a splitter 54, and an optical line termination (OLT) 42. In one exemplary embodiment, the PON 30 is a gigabit PON (GPON) or broadband PON (BPON), but other types of PONs are possible in other embodiments.

In one exemplary embodiment, the OLT 42 resides at an intermediate point between a network facility, such as a central office (CO) of the network 52, and at least one customer premises serviced by the OLT 42. However, other locations of the OLT 42 are possible in other embodiments.

As shown by FIG. 1, each ONU 52 receives at least one data stream via at least one conductive connection 58, such as a twisted wire-pair, from customer premises equipment (CPE) 24 at a respective customer premises. In a fiber-to-the-home (FTTH) architecture, each ONU 52 resides at a respective customer premises. In a fiber-to-the-curb (FTTC) or fiber-to-the-node (FTTN) architecture, each ONU 52 resides at a point between the OLT 42 and at least one customer premises serviced by the ONU 52. Further, in one exemplary embodiment, each ONU 52 is coupled to a set of CPE 24 residing at a single respective customer premises. However, it is possible for any ONU 52 to be coupled to and service CPE 24 at multiple customer premises in other embodiments.

As shown by FIG. 1, the PON 30 has a splitter 54 that is coupled on one side to the optical fiber 35 and on the other side to the ONUs 52 via a plurality of optical fibers 56. The splitter 54 receives an optical signal from the optical fiber 35 and splits the received optical signal such that it is received by each of the ONUs 52. Each ONU 52 demodulates the optical signal to recover the data carried by such signal. The data defines data packets carrying data from the network 52, and such data packets are forwarded to CPE 24. In one exemplary embodiment, the optical fiber 35 also carries a control channel through which control information, which pertains to management of the communication occurring across the optical fiber 35, may be communicated between the ONUs 52 and the OLT 42, as will be described in more detail below.

In the upstream direction, each ONU 52 receives an electrical signal carrying data packets from CPE 24. The ONU 52 maps each received packet into the appropriate queue (not shown in FIG. 1) which is connected to a TCONT (not shown in FIG. 1). At the time indicated by a bandwidth grant for this TCONT, the ONU 52 modulates an optical signal with the data, and transmits the modulated optical signal to the splitter 54, which combines all of the optical signals received from the ONUs 52 to form a combined optical signal that is transmitted across the fiber 35 to the OLT 42 (FIG. 1).

Figure 2:
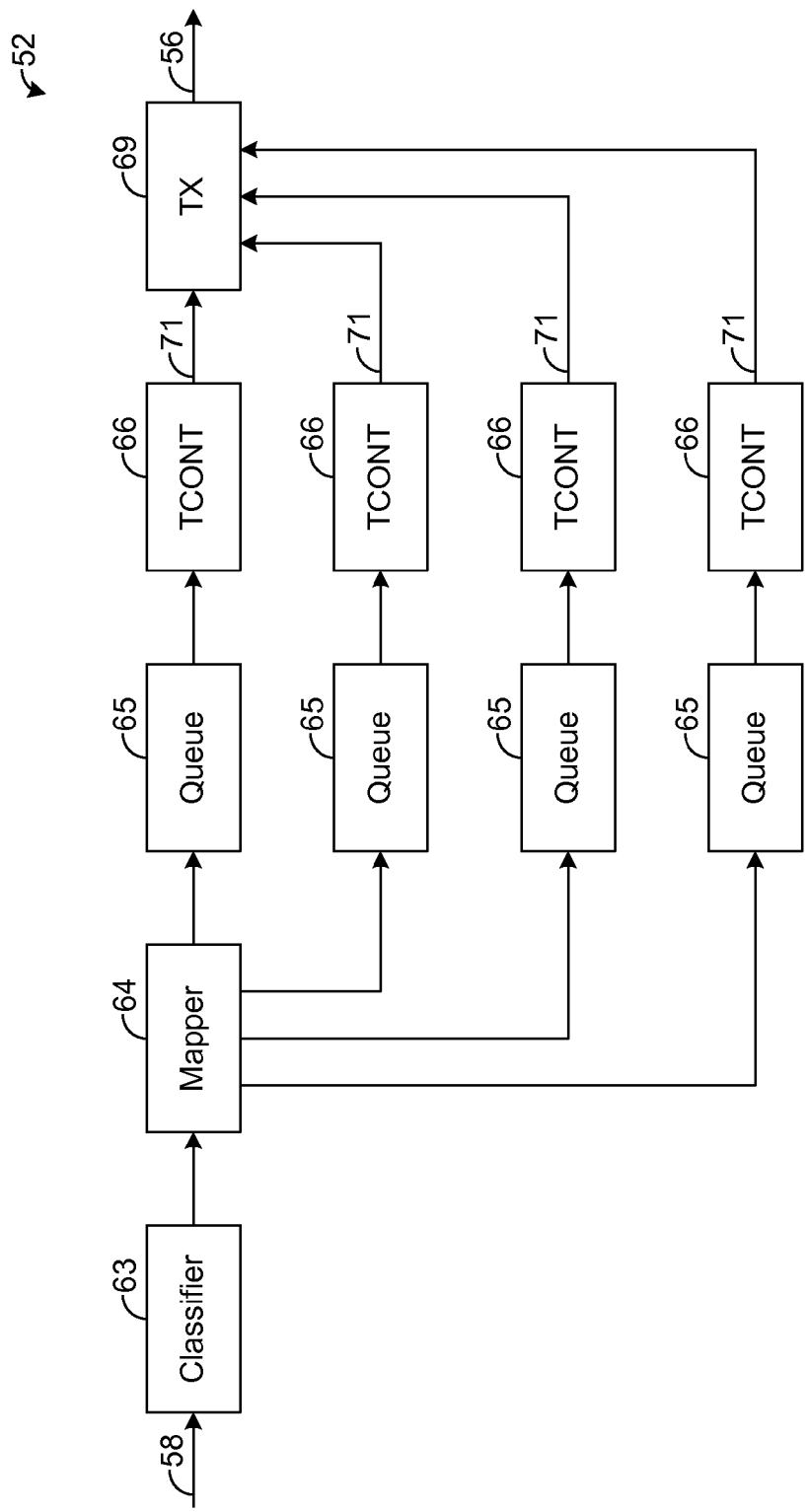
FIG. 2 is a block diagram illustrating an exemplary embodiment of an optical network unit (ONU), such as is depicted by FIG. 1.

FIG. 2 depicts an exemplary embodiment of an ONU 52. The ONU 52 of FIG. 2 has a classifier 63 that receives data packets from a conductive connection 58 coupled to CPE 24 (FIG. 1). The classifier 63 is configured to analyze and classify each packet received from the connection 58. In this regard, the traffic may be associated with different services, such as Internet, voice, television, etc., and the packets may be classified based upon service type or other classification parameters. As an example, the classifier 63 may assign a class to a particular packet based on information in the packet's header, such as its destination or source address. Various known or future-developed techniques for classifying packets are possible.

As shown by FIG. 2, the ONU 52 has a mapper 64 that is configured to map each packet to a particular queue 65 of the ONU 52 based on the packet's classification, as determined by the classifier 63, and the mapper 64 transmits each packet to the respective queue 65 that is mapped to it. Each queue 65 is coupled to a respective traffic container (TCONT) 66, which is respectively coupled to an optical transceiver 69 via a conductive connection 71, and the transceiver 69 is coupled to the splitter 54 (FIG. 1) via an optical fiber 56. Each TCONT 66 communicates with the OLT 42 (FIG. 1) via the optical fiber 35, which is shared among the ONUs 52, and the OLT 42 dynamically allocates the bandwidth of the upstream communication from the ONUs 52 to the OLT 42. In this regard, the OLT 42 respectively allocates time slots to the TCONTS 66. Each time slot is allocated to only one TCONT 66 so that data collisions on the optical fiber 35 are prevented via time division multiplexing (TDM), as is known in the art.

For each time slot allocated to a given TCONT 66, the TCONT 66 may pull data from its respective queue 65 and transmit the data to the transceiver 69, which modulates an optical signal with the data so that the data is transmitted across the optical fiber 35 to the OLT 42 (FIG. 1). In this regard, the optical signal is transmitted via an optical fiber 56 to the splitter 54. The optical signal then passes through the splitter 54 and across the optical fiber 35 to the OLT 42. As shown by FIG. 1, the OLT 42 has an optical transceiver 59 that is configured to receive the upstream optical signal from the fiber 35. Such signal carries the data transmitted by the TCONTs 65 (FIG. 2). As described above, the data is time division multiplexed across the optical fiber 35 by the TCONTs 65 under the control of the OLT 42.

The transceiver 59 demodulates the received optical signal to recover the data carried by such signal. The transceiver 59 forwards the data to processing circuitry 61, which processes the data as may be desired. As an example, the processing circuitry 52 may modulate a signal with the data for transmission to the network 52. As will be described in more detail below, the DBA logic 83 is configured to communicate with the TCONTS 66 of the ONUs 52 via a control channel over the optical fiber 35 or otherwise in order to discover the backlog status for each TCONT 66 and to schedule TCONT transmissions. Thus, the DBA logic 83 implements status reporting DBA, but in other embodiments, the DBA logic 83 may be configured to implement non-status reporting DBA, if desired.

It should be noted that the DBA logic 83 can be implemented in software, hardware, firmware, or any combination thereof. In an exemplary embodiment illustrated in FIG. 3, the DBA logic 83, along with its associated methodology, is implemented in software and stored in memory 86 of an instruction execution apparatus 88, such as a microprocessor.

Note that the DBA logic 83, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

Figure 3:
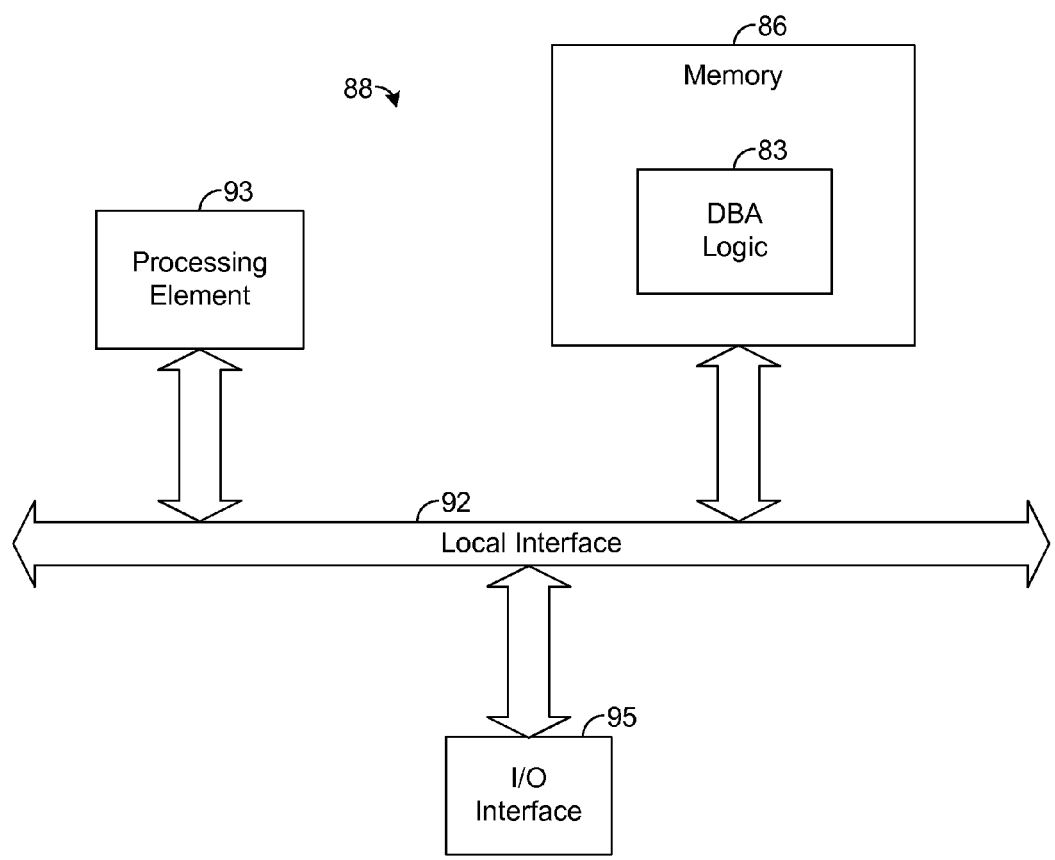
FIG. 3 is a block diagram illustrating an exemplary embodiment of an instruction execution apparatus for executing instructions of dynamic bandwidth allocation (DBA) logic when such DBA logic is implemented in software.

The exemplary embodiment of the apparatus 88 depicted by FIG. 3 comprises at least one conventional processing element 93, such as a digital signal processor (DSP) or a central processing unit (CPU), that communicates to and drives the other elements within the apparatus 88 via a local interface 92, which can include at least one bus. Furthermore, an input/output (I/O) interface 95, such as I/O pins or ports, can be used to exchange data with devices external to the apparatus 88, such as the transceiver 59 (FIG. 1).

Figure 4:
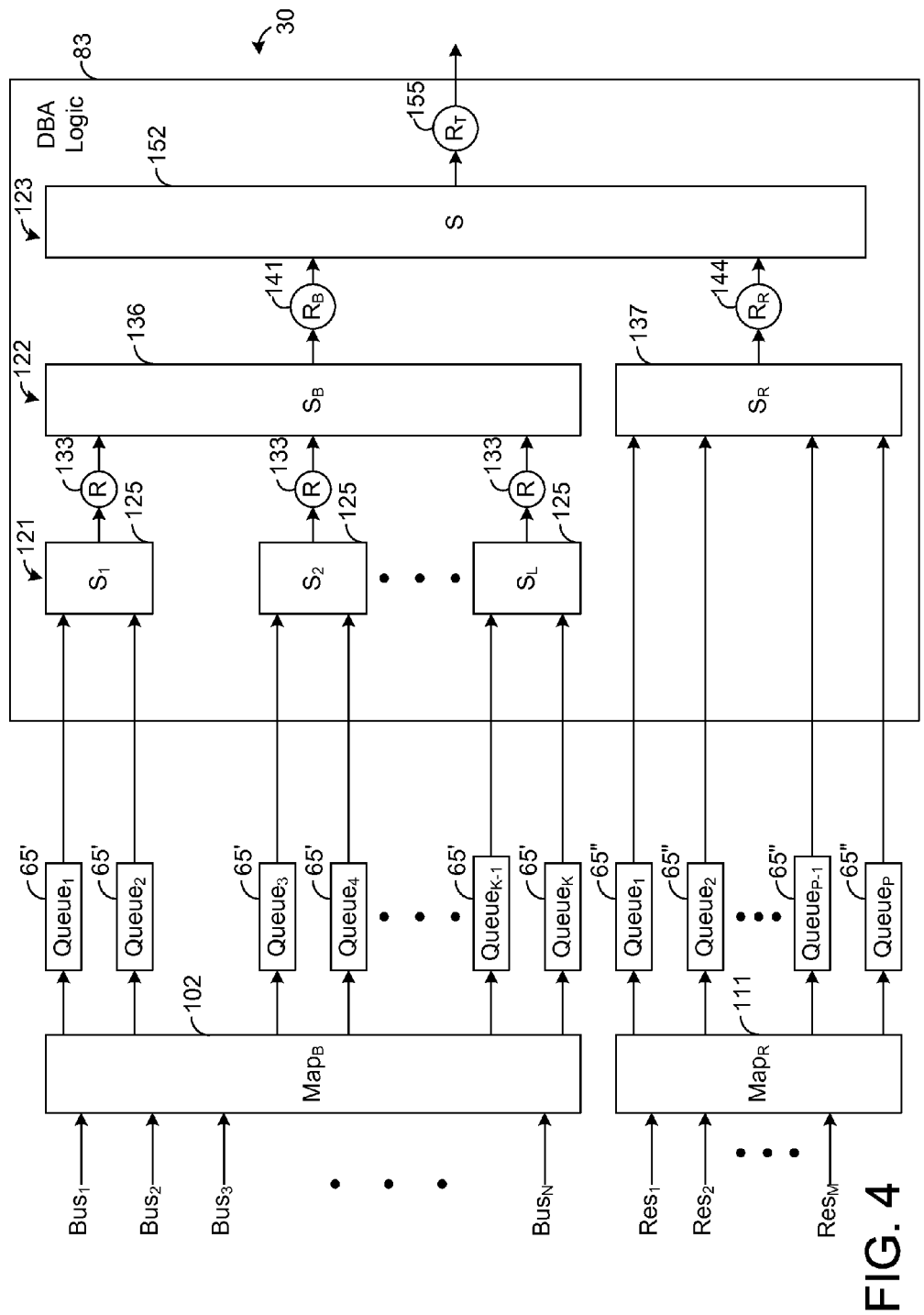
FIG. 4 is a block diagram illustrating an exemplary conceptual flow of data between ONUs and an optical line termination (OLT), such as is depicted by FIG. 1.

FIG. 4 depicts an exemplary scheduling hierarchy implemented by the DBA logic 83 and a conceptual flow of data through the PON 30. Note that the data is actually time division multiplexed across the optical fiber 35 (FIG. 1) according to the scheduling implemented by the DBA logic 83. As shown by FIG. 4, the ONUs 52 implement a business service mapper (Map$_B$) 102 that maps packet flows for business services to a plurality of ONU queues 65'. Each packet flow mapped by the mapper 102 comprises packets for a respective business service, and a given business customer may be associated with more than one such packet flow. As an example, one of the packet flows may be for telephone services from a particular customer, while another of the packet flows may be for high-speed Internet from the same customer. There are N business services with each such service associated with a respective packet flow, and there are L business customers, where L is a positive integer equal to or less than N.

There are K queues 65' that receive business traffic (Bus), where K is any positive integer. Each queue 65' represents a particular class of business services. In this regard, as is known in the art, packet flows may be grouped into classes, and the classes may be assigned priorities and weights. Various processing, such as scheduling, may be performed based on the classes and, hence, priorities and weights assigned to the packets. In one exemplary embodiment, the packets are mapped to the queues 65' according to traffic class and customer. In this regard, the packets are mapped such that all of the packets in the same queue 65' are from the same customer and are members of the same class. As an example, all of the packets carrying voice data from the same customer may be mapped to the same queue 65' or the same set of queues 65'. However, packets carrying Internet data from the foregoing customer may be assigned a different class and mapped to a different queue 65' or a different set of queues 65'.

The ONUs 52 also implement a residential service mapper (Map$_R$) 111 that maps packet flows for residential services to a plurality of ONU queues 65". Each packet flow mapped by the mapper 111 comprises packets for a respective residential service, and a given residential customer may be associated with more than one such packet flow. There are M residential services with each such service associated with a respective packet flow.

There are P queues 65" that receive residential traffic (Res), where P is any positive integer. Each queue 65" represents a particular class of residential services. That is, the packets are mapped to the queues 65" according to traffic class such that all of the packets in the same queue 65" are members of the same class. As an example, all of the packets carrying voice data may be mapped to the same queue 65" or the same set of queues 65". However, packets carrying Internet data may be assigned a different class and mapped to a different queue 65" or a different set of queues 65".

Packets from the queues 65' and 65" are transmitted across the optical fiber 35 (FIG. 1) to the OLT 42. The scheduling of transmission from the ONU 52 across the fiber 35 is controlled by the DBA logic 83. In the exemplary embodiment depicted by FIG. 4, the DBA logic 83 implements three levels 121-123 of schedulers.

In particular, a first scheduler level 121 includes a plurality of schedulers 125. Each scheduler 121 is associated with a respective business customer and controls the scheduling of queues 65' that receive the customer's packets. Thus, in the example of FIG. 4 where there are L business customers, there are L schedulers 125, one for each business customer. As an example, if each queue 65' of an ONU 52 is associated with the same business customer, then the same scheduler 125 controls scheduling for all of the queues 65' in the ONU 52. The scheduler 125 may implement any desired scheduling algorithm, such as strict priority, weighted fair queuing, or any other known or future-developed scheduling algorithm. For simplicity of illustration, FIG. 4 shows two queues 65' for each scheduler 125, but any scheduler 125 may control any number of queues 65' in other embodiments.

At the scheduling level 121, each queue 65' associated with a given customer's business service traffic is scheduled by the same scheduler 125, which can assign a priority and weight to each such queue 65'. In one exemplary embodiment, queues 65' with the same priority are scheduled according to their weight (e.g., weighted fair queuing), whereas queues with different priorities are scheduled according to priority (e.g., strict priority). Note that for simplicity of illustration, TCONTs 66 (FIG. 2) are not shown in FIG. 4. There is a one-to-one correspondence between the queues 65 and TCONTs 66 such that each TCONT 66 pulls packets from the same queue. Thus, the priority and weight assigned to a given queue 65 may be considered to be assigned to the TCONT 66 that services the queue 65. As used herein, assigning a priority or weight to a queue 65 shall be used synonymously with assigning a priority or weight to the TCONT 66 that services the queue 65.

The scheduling performed by level 121 permits prioritization and/or weighting among traffic classes for traffic from the same business customer. For example, by assigning a higher priority or weight to one queue 65' over another, a scheduler 125 can discriminate a flow of one class from one customer relative to the other flows of different classes from the same customer. That is, the scheduler 125 can discriminate the flows of the same customer on a per class basis.

As shown by FIG. 4, the DBA logic 83 further implements shapers 133 that respectively shape the rates of the schedulers 125. That is, each shaper 133 shapes the output of a respective scheduler 125 to a specified rate threshold "R," where the shaped rate (R) for each shaper 133 may be different, if desired. When the queues 65' feeding a particular scheduler 125 are backlogged, the time between the start of two consecutive packets from such queues 65' is equal to the length of packet (in bits) divided by the specified shape rate, in bits/second.

A second scheduler level 122 includes a scheduler ($S_B$) 136, referred to hereafter as the "business traffic scheduler" for clarity, for the business traffic and a scheduler ($S_R$) 137, referred to hereafter as the "residential traffic scheduler" for clarity, for the residential traffic. The aggregate traffic from the schedulers 125 are scheduled by the business traffic scheduler 136, which can assign a priority and weight to each scheduler 125. In one exemplary embodiment, schedulers 125 with the same priority are scheduled according to their weight (e.g., weighted fair queuing), whereas schedulers 125 with different priorities are scheduled according to priority (e.g., strict priority).

The scheduling performed by level 122 permits prioritization and/or weighting among business customers. For example, by assigning a higher priority or weight to one scheduler 125 over another, the business traffic scheduler 136 can discriminate the flows of one customer relative to the flows of another customer. That is, the scheduler 125 can discriminate the flows of different customers on a per customer basis.

As shown by FIG. 4, the DBA logic 83 implements a shaper 141 that shapes the rate of the scheduler 136. In particular, the shaper 141 shapes the output of the business traffic scheduler 136 to a specified rate threshold "$R_B$."

The residential traffic buffered by the queues 65" is scheduled by the residential traffic scheduler 137, which can assign a priority and weight to each queue 65". In one exemplary embodiment, queues 65" with the same priority are scheduled according to their weight (e.g., weighted fair queuing), whereas queues 65" with different priorities are scheduled according to priority (e.g., strict priority).

The scheduling performed by the residential traffic scheduler 137 permits prioritization and/or weighting among traffic classes for the residential traffic. For example, by assigning a higher priority or weight to one queue 65" over another, the residential traffic scheduler 137 can discriminate residential flows of one class from residential flows of another class.

As shown by FIG. 4, the DBA logic 83 implements a shaper 144 that shapes the rate of the residential traffic scheduler 137. That is, the shaper 144 shapes the output of the residential traffic scheduler 137 to a specified rate threshold "$R_R$."

A third scheduler level 123 includes a scheduler 152. The aggregate traffic from the business traffic scheduler 136 and the residential traffic scheduler 137 are scheduled by the scheduler 152, which can assign a priority and weight to each scheduler 136 and 137. In one exemplary embodiment, if schedulers 136 and 137 are assigned the same priority, then they are scheduled according to their weight (e.g., weighted fair queuing). If the schedulers 136 and 137 are assigned different priorities, then they are scheduled according to priority (e.g., strict priority).

The scheduling performed by level 123 permits prioritization and/or weighting among business traffic and residential traffic. For example, by assigning a different (e.g., higher)

priority or weight to the business traffic scheduler 136 over the residential traffic scheduler 137, the scheduler 152 can discriminate business traffic relative to residential traffic.

As shown by FIG. 4, the DBA logic 83 implements a shaper 155 that shapes the rate of the scheduler 152, which represents the aggregate or total rate for both business and residential traffic. That is, the shaper 15 shapes the output of the scheduler 152 to a specified rate threshold "$R_T$."

In one exemplary embodiment, the DBA logic 83 operates to allow oversubscription of services while ensuring a desired level of capacity for a particular group of services, such as business services. As an example, service level agreements (SLAs) may specify various performance metrics, such as minimum data rates, maximum latency, maximum jitter, and maximum packet loss probability, that are guaranteed by the network service provider. It is possible to configure the system such that it is capable of meeting the specified performance metrics during periods of peak usage. However, to provide such a guarantee, the amount of services must be limited based on network capacity.

It is generally recognized that each service is not likely to be active at the same time. Taking advantage of this knowledge, a network service provider might oversubscribe services by enabling more services than can be handled by the network at the same time. Due to such oversubscription, it is possible for customer traffic to exceed the capacity of the PON 30 such that at least some SLA performance metrics are violated.

In one exemplary embodiment, the DBA logic 83 is configured to ensure, based on the priorities and weights assigned by the schedulers, that the SLA performance metrics for at least some select services are not violated even during periods of peak usage. In particular, for one exemplary embodiment, the scheduler 152 discriminates among business traffic and residential traffic such that if SLA performance metrics for all of the traffic cannot be handled without violating the SLA performance metrics, then the business traffic is allocated a priority or weight relative to the residential traffic such that the SLA performance metrics for the business traffic are maintained (i.e., not violated). To achieve such a guarantee, the DBA logic 83 limits the available bandwidth of the PON 30 for residential services to an extent such that the SLA performance metrics for all of the business traffic can be maintained.

In the exemplary embodiment shown by FIG. 4, if the sum of $R_B$ and $R_R$ is less than or equal to $R_T$, then the residential and business services effectively operate independently, and do not share bandwidth. If the sum of $R_B$ and $R_R$ is greater than $R_T$, then during times of congestion, the residential and business services will be scheduled according to the scheduler 152. If the scheduler 152 implements strict priority (with the business traffic scheduler 136 assigned a higher priority than the residential traffic scheduler 137) and $R_R$ is less than $R_B$, which is less than $R_T$, then the business services can usurp or "burst into" the bandwidth of the residential services during times of congestion but not completely starve the residential services. If the scheduler 152 implements weighted scheduling (e.g., weighted fair queuing), then the business services and residential services will share the link capacity during times of congestion according to the weights assigned by the scheduler 152.

Figure 5:
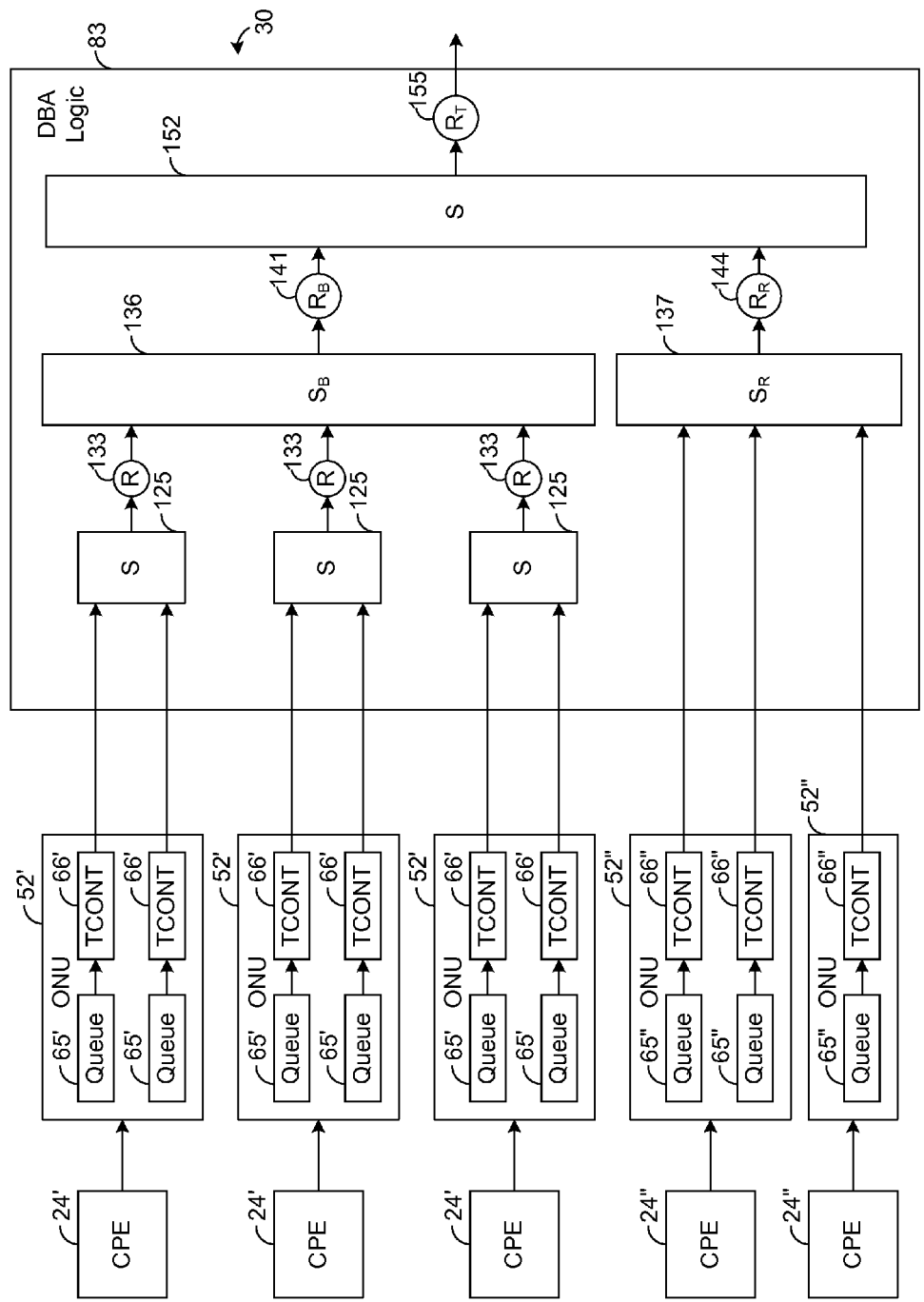
FIG. 5 is a block diagram illustrating an exemplary conceptual flow of data between ONUs and an OLT, such as is depicted by FIG. 1.

FIG. 5 depicts an exemplary embodiment in which a plurality of ONUs 52' receive business traffic from business customers and a plurality of ONUs 52" receive residential traffic from residential customers. For purposes of simplicity, each ONU 52' and 52" is shown as having two queues and two TCONTs, but any of the ONUs may have any number of queues and TCONTs in other embodiments. Further, it is assumed that there are three business customers, each of which is providing data from a respective set of CPE 24' to a respective ONU 52', and two residential customers, each of which is providing data from a respective set of CPE 24" to a respective ONU 52". In other embodiments, other numbers of business customers and/or residential customers are possible.

Note that it is desirable for residential services to be assigned TCONTs different from those assigned to business services to allow the scheduler 152 to assign different priorities and weights to the residential traffic relative to the business traffic. Further, in FIG. 5, a single ONU 52' or 52" carries either residential or business traffic but not both. In other embodiments, it is possible for any ONU to carry both business and residential traffic, but it is desirable for a given queue and TCONT pair to service only residential or business traffic to allow the scheduler 152 to discriminate between groups of business traffic and residential traffic.

For each of the ONUs 52' receiving business traffic from a respective business customer, the ONU 52' classifies and maps each received packet to one of its queues 65'. One of the schedulers 125 of the first scheduler level 121 communicates with the TCONTs 66' of the ONU 52' to learn the backlog status of the associated queues 65'. In one exemplary embodiment, the scheduler 125 transmits control information (e.g., control words) via a control channel over the optical fiber 35 (FIG. 1) to the TCONTs 66'. Each such control word identifies (includes the address of) one of the TCONTs 66', which responds by transmitting control information via the control channel to the scheduler 125. The control information received by the scheduler 125 has a value indicating the amount of data currently buffered by the queue 65' serviced by the TCONT 66'.

Based on the backlogs of all of the queues 65' in the ONU 52' serviced by the scheduler 125 and the scheduling implemented by the scheduler 125 (e.g., the scheduling type, as well as the weights and priorities assigned to the queues 65' by the scheduler 125, and the rate (R) of shaper 133 associated with the scheduler 125), the scheduler 125 selectively allocates time slots to the TCONTs 66' serviced by it. In this regard, the scheduler 125 transmits control information (e.g., control words) across the optical fiber 35 to the TCONTs 66'. Each such control word identifies one of the TCONTs 66' and at least one time slot for which the TCONT 66' may transmit across the fiber 35. In response, the TCONT 66' transmits during the identified time slot or slots. In this regard, the TCONT 66' may transmit control information (e.g., responding to a previous backlog status poll) or transmit data packets from its queue 65'. For each time slot, only one TCONT on the PON 30 is permitted to transmit across the optical fiber 35 in order to avoid data collisions.

Note that the residential traffic scheduler 137 similarly communicates with the TCONTs 66" of the ONUs 52" receiving residential traffic from CPEs 24" to selectively allocate time slots to the TCONTs 66". Accordingly, like the TCONTs 66', each of the TCONTs 66" is allocated certain time slots in which it is permitted to transmit over the optical fiber 35.

Referring to FIG. 5, the TCONTs 66' are assigned priorities and weights to implement the scheduling level 121. The business service TCONTs 66' for the same business customer (e.g., from the same CPE 24') are grouped together, scheduled by a respective scheduler 125, shaped to a respective rate (R) by a respective shaper 133, and assigned a respective priority and weight by the business traffic scheduler 136. All residential services are grouped together, scheduled by the residential traffic scheduler 137, shaped to a rate ($R_R$), and assigned a priority and weight by the scheduler 152. Further, the aggregate business and residential traffic is scheduled and shaped to a rate ($R_T$).

In one exemplary embodiment, the scheduling is controlled to allow the residential services to be oversubscribed while still ensuring compliance of service level guarantees for the business services. In this regard, during periods of congestion resulting from oversubscription of residential services, the rate limiting performed by the shaper 144 in conjunction with scheduler 152 limits the bandwidth consumed by the residential services such that sufficient bandwidth is available for the business services to meet their specified SLAs.

As a mere example, referring to FIG. 5, assume that the capacity of the system 20 is such that 1 Giga-bits per second (Gbps) can be transmitted from the ONUs 52' and 52" to the OLT 42. Further, assume that SLAs for the business customers specify a total minimum rate of 700 Mbps such that 300 Mbps may be used for residential services without violating SLA guarantees. However, assume that the network service provider oversubscribes the residential services such that if all residential customers are attempting to transmit at the same time, the aggregate rate required to accommodate just the residential service would exceed 500 Mbps. Accordingly, without weighted scheduling favoring the business services, the minimum transmission rates specified by the SLAs for the business services could be violated. For illustrative purposes, assume that the scheduler 152 is provisioned to implement weighted fair queuing (WFQ).

In such an example, the scheduler 152 may be provisioned to assign a weight of 0.7 for the business traffic scheduler 136 and a weight of 0.3 for the residential traffic scheduler, and the shaper 155 may be provisioned to shape the output of the scheduler 152 to a rate of 1 Gbps. In such an example where WFQ is used, implementation of the shapers 141 and 144 is unnecessary to allow the oversubscription of residential services while ensuring the SLA guarantees of the business services are satisfied, as will be described in more detail below.

For illustrative purposes, assume that all customers are attempting to transmit causing congestion. In such an example, the weighting implemented by the scheduler 152 and the shaping implemented by the shaper 155 ensure that the rate of 700 Mbps is allocated to the business services without completely starving the residential services. In particular, the rate of 300 Mbps is allocated to the residential services. The schedulers 125 and 136 are provisioned such that the SLA minimums of each business customer are satisfied when no more than 700 Mbps is allocated to the business traffic scheduler 136 and, hence, the business services. In such a scenario, the SLA guarantees of the business services are maintained, whereas the residential services are only allowed 300 Mbps. That is, bandwidth allocated to the residential services is sufficiently limited to keep from violating the SLA performance metrics of the business services despite oversubscription of residential services. Note that the scheduling implemented by the residential traffic scheduler 137 controls the extent to which one residential service is limited relative to another.

In another exemplary embodiment, the scheduler 152 is provisioned to implement strict priority scheduling with the business traffic scheduler 136 assigned a higher priority than the residential traffic scheduler 137. Thus, if both residential traffic and business traffic are in contention for the same time slot, the scheduler 152 ensures that the time slot is allocated to the business traffic since it is assigned a higher priority. However, to prevent the business traffic from completely starving the residential traffic, the shaper 141 is provisioned to shape the flow from the business traffic scheduler 136 to a rate below 1 Gbps so that at least some bandwidth is conserved for the residential traffic. If the rate to which the shaper 141 shapes such flow is at least 700 Mbps, then it can be ensured that the SLA guarantees for the business services will not be violated. The closer that such rate is set to 700 Mbps without going below 700 Mbps, the more bandwidth is conserved for the residential services without violating the SLA performance metrics for the business services. As an example, the rate of the shaper 141 may be set to 700 Mbps while the rate of the shaper 144 may be set to 300 Mbps. In other embodiments, other rates and scheduling techniques are possible.

In various embodiments described above, hierarchical DBA is used to ensure service level agreements for business services to be maintained despite oversubscription of residential services. In other embodiments, a similar hierarchical DBA may be used to ensure service level guarantees for other classes of services, such as the services of a few select customers, despite service oversubscription. Indeed, it is unnecessary for the discrimination of services to occur along the lines of whether the services are classified as residential or business.

In addition, it is possible for the hierarchical DBA to have any number of levels for any number of sub-groups. As an example, referring to FIG. 5, it is possible for a plurality of schedulers (not shown) of an additional scheduling level (not shown) to schedule the services for a given set of business customers and feed data to the schedulers 125 of level 121. Also, it is possible for there to be a plurality of schedulers (not shown) to schedule the residential services and feed data to the residential service scheduler 137. Yet various other configurations of the hierarchical DBA are possible in other embodiments.

The invention claimed is:

1. A passive optical network, comprising:
an optical fiber;
a plurality of optical networks units (ONUs) coupled to the optical fiber and having a plurality of business traffic containers (TCONTs) and residential TCONTS, each of the business TCONTs configured to receive a respective class of business traffic from a respective business customer, each of the residential TCONTs configured to receive a respective class of residential traffic; and
an optical line termination (OLT) coupled to the optical fiber, the OLT having dynamic bandwidth allocation (DBA) logic configured to implement a scheduling hierarchy for scheduling transmissions from the business and residential TCONTs to the OLT across the optical fiber, the scheduling hierarchy having at least a first scheduling layer, a second scheduling layer, and a third scheduling layer, wherein the first scheduling layer has a plurality of schedulers for scheduling business traffic from the business TCONTs, each of the plurality of schedulers of the first scheduling layer for scheduling business traffic from a respective plurality of the business TCONTs servicing a single respective business customer thereby enabling traffic flows of different classes from the single respective business customer to be discriminated on a per class basis via the scheduling hierarchy, wherein the second scheduling layer has at least a business traffic scheduler and a residential traffic scheduler, the business traffic scheduler for scheduling the business traffic scheduled by the plurality of schedulers of the first scheduling layer thereby enabling traffic flows from different business customers to be discriminated on a per customer basis via the scheduling hierarchy, the residential traffic scheduler for scheduling residential traffic from the residential TCONTs thereby enabling traffic flows of different classes of the residential traffic from the residential TCONTs to be discriminated on a per class basis via the scheduling hierarchy, wherein the third scheduling layer has at least a scheduler for scheduling the business traffic scheduled by the business traffic scheduler and the residential traffic scheduled by the residential traffic scheduler thereby enabling the business traffic scheduled by the business traffic scheduler to be discriminated, via the scheduling hierarchy, relative to the residential traffic scheduled by the residential traffic scheduler.

2. The network of claim 1, wherein the DBA logic is configured to allow, via the scheduling hierarchy, oversubscription of residential services from which the residential traffic received by the residential TCONTs is derived while maintaining specified performance metrics for business services from which the business traffic received by the business TCONTs is derived.

3. The network of claim 1, wherein the scheduler of the third scheduling layer implements weighted scheduling and assigns a first weight to the business traffic scheduler and a second weight to the residential traffic scheduler.

4. The network of claim 1, wherein the scheduler of the third scheduling layer implements strict priority scheduling and assigns a first priority to the business traffic scheduler and a second priority to the residential traffic scheduler.

5. The network of claim 1, wherein the scheduling hierarchy has a first shaper, a second shaper, and a third shaper, the first shaper for limiting a rate of the business traffic scheduled by the business traffic scheduler, the second shaper for limiting a rate of the residential traffic scheduled by the residential traffic scheduler, the third shaper for limiting the business and residential traffic scheduled by the scheduler of the third scheduling layer.

6. A dynamic bandwidth allocation (DBA) method for use in a passive optical network, comprising:
mapping business traffic from a plurality of business customers to a plurality of business traffic containers (TCONTs) in a plurality of optical network units (ONUs) such that each of the business TCONTs receives a respective class of business traffic from a respective business customer;
mapping residential traffic from a plurality of residential customers to a plurality of residential TCONTs in the plurality of ONUs such that each of the residential TCONTs receives a respective class of residential traffic; and
scheduling transmissions from the ONUs to an optical line termination (OLT) across an optical fiber via a scheduling hierarchy having a first scheduling layer, a second scheduling layer, and a third scheduling layer, wherein the scheduling comprises:
scheduling business traffic from the business TCONTs via the first scheduling layer such that traffic flows of different classes from the business TCONTs are discriminated on a per class basis;
scheduling, via the second scheduling layer, the business traffic scheduled by the first scheduling layer such that traffic flows of different business customers are discriminated on a per customer basis;
scheduling, via the second scheduling layer, residential traffic from the residential traffic such that traffic flows of different classes from the residential TCONTs are discriminated on a per class basis; and
scheduling, via the third scheduling layer, the residential and business traffic scheduled by the second scheduling layer such that the business traffic scheduled by the second scheduling layer is discriminated relative to the residential traffic scheduled by the second scheduling layer.

7. The method of claim 6, oversubscribing residential services from which the residential traffic received by the residential TCONTs is derived, wherein the scheduling of the transmissions is performed such that specified performance metrics for business services are maintained, wherein the business traffic received by the business TCONTs is derived from the business services.

8. The method of claim 6, further comprising:
shaping the business traffic scheduled by the second scheduling layer;
shaping the residential traffic scheduled by the second scheduling layer; and
shaping the business and residential traffic scheduled by the third scheduling layer.

* * * * *